(12) United States Patent
Helén et al.

(10) Patent No.: US 10,419,337 B2
(45) Date of Patent: Sep. 17, 2019

(54) METHODS, ROUTING DEVICE AND FURTHER ROUTING DEVICE FOR MANAGING DATA FRAMES IN SWITCHED NETWORKS

(71) Applicant: Telefonaktiebolaget LM Ericsson (publ), Stockholm (SE)

(72) Inventors: Per Helén, Saltsjö-Boo (SE); Clarence Ammervik, Älvsjö (SE); Johan Lindström, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 79 days.

(21) Appl. No.: 15/519,663

(22) PCT Filed: Nov. 26, 2014

(86) PCT No.: PCT/SE2014/051410
§ 371 (c)(1),
(2) Date: Apr. 17, 2017

(87) PCT Pub. No.: WO2016/085375
PCT Pub. Date: Jun. 2, 2016

(65) Prior Publication Data
US 2017/0257313 A1   Sep. 7, 2017

(51) Int. Cl.
*H04L 12/713* (2013.01)
*H04L 12/721* (2013.01)
(Continued)

(52) U.S. Cl.
CPC ............ *H04L 45/586* (2013.01); *H04L 45/28* (2013.01); *H04L 45/66* (2013.01); *H04L 61/6022* (2013.01)

(58) Field of Classification Search
CPC ....... H04L 45/586; H04L 45/66; H04L 45/28; H04L 61/6022
See application file for complete search history.

(56) References Cited

U.S. PATENT DOCUMENTS 7,055,173 B1 *   5/2006   Chaganty ............ H04L 41/0654
                                                         726/11
2008/0008192 A1 *   1/2008   Matoba ............. H04L 29/12028
                                                         370/397
(Continued)

FOREIGN PATENT DOCUMENTS

CN          103200117 A   *   7/2013

OTHER PUBLICATIONS

CN103200117 (A) Abstract. Jul. 10, 2013, [retrieved on Nov. 10, 2018], Retrieved from Espacenet using Internet <URL:https://worldwide.espacenet.com/publicationDetails/biblio?II=0&ND=3&adjacent=true&locale=en_EP&FT=D&date=20130710&CC=CN&NR=103200117A&KC=A#> (Year: 2013).*

*Primary Examiner* — Omar J Ghowrwal
(74) *Attorney, Agent, or Firm* — Coats & Bennett, PLLC

(57) ABSTRACT

A method and a routing device (110) for managing data frames as well as a method and a further routing device (120) for managing data frames are disclosed. The routing device (110) is addressable by a virtual Media Access Control address, "virtual MAC address", for assignment to routers. The routing device (110) sends (205) a data frame comprising a source MAC address field, which includes a unicast MAC address of the routing device (110). The routing device (110) sends (208) a message including information about the virtual MAC address. The routing device (110) is configured to send, in a periodic manner, a periodic message for conveying information about the virtual MAC address throughout the switched network (100). In another embodiment, the further routing device (120) receives (201) at least one data frame. The further routing device (120) sends (202) a request which instructs the routing device (110) to send an alert message for conveying information
(Continued)

about the virtual MAC address. Corresponding computer programs and carriers therefor are also disclosed.

12 Claims, 4 Drawing Sheets

(51) Int. Cl.
*H04L 12/703* (2013.01)
*H04L 29/12* (2006.01)

(56) References Cited

U.S. PATENT DOCUMENTS

| | | | |
|---|---|---|---|
| 2013/0003759 A1* | 1/2013 | Sergeev | H04L 12/42 370/498 |
| 2014/0211801 A1* | 7/2014 | Trainin | H04W 8/26 370/392 |
| 2016/0043950 A1* | 2/2016 | Vobbilisetty | H04L 45/745 370/392 |

* cited by examiner

METHODS, ROUTING DEVICE AND FURTHER ROUTING DEVICE FOR MANAGING DATA FRAMES IN SWITCHED NETWORKS

TECHNICAL FIELD

Embodiments herein relate to communication systems, such as switched networks. In particular, a method and a routing device for managing data frames as well as a method and a further routing device for managing data frames are disclosed. Corresponding computer programs and carriers therefor are also disclosed.

BACKGROUND

A communication system is sometimes conceptually described by an Open Systems Interconnection model (OSI). The model partitions internal functions of the communication system into abstraction layers, such as physical layer (layer 1), data link layer (layer 2), network layer (layer 3), transport layer (layer 4), etc.

An Ethernet network, as an example of a known communication system, is often considered to be part of layer 2. The Ethernet network is also an example of a so called switched network, which uses only network switches rather than network hubs. The difference between network switches and hubs is that hubs forward data frames on all its ports at all times, while the network switches attempts to forward data frames only on those ports that are relevant for a certain data frame.

The Ethernet network may carry a protocol called Virtual Router Redundancy Protocol (VRRP), which is a known Internet Protocol. In other examples, the Ethernet network may carry Hot Standby Router Protocol (HSRP). The VRRP protocol provides automatic assignment of VRRP roles, routers in the Ethernet network. The VRRP roles include virtual router master and virtual router backup.

This kind of known Ethernet network may comprise multiple physical routers, which may be arranged and configured to represent a virtual router. The virtual router is assigned a VRRP MAC address. If the physical router that is routing data frames on behalf of the virtual router fails—or a link connected to a port of the physical router fails—, another physical router is selected automatically to replace it. A physical router that is receiving data frames addressed to the VRRP MAC address, e.g. at an interface of that physical router, has the role of virtual router master.

The Ethernet network also comprises a number of network switches for forwarding data frames within the Ethernet network towards their respective destinations, such as the virtual router, i.e. a physical router having the role of virtual router master. The data frames are Media Access Control (MAC) data frames, which include a destination MAC address field and a source MAC address field. See e.g. Institute of Electrical and Electronics Engineers (IEEE) 802.3 specifications.

When a network switch receives a data frame, it looks up a destination MAC address, located in the destination MAC address field of the received data frame, in a so called MAC address table in order to find out at which port of the network switch the received data frame should be feed. Additionally, the networks switch checks the source address field of the received data frame and notes at which port the received data frame was received.

When the MAC address in the source address field of the received data frame is not present in the MAC address table of the switch, the source address field and the port, at which the data frame was received, is put into the MAC address table for future use. It may also be the case that the MAC address in the source address field is mapped, according to the MAC address table, to another port. Then, the MAC address table needs to be updated. This process of populating the MAC address table is sometimes referred to as MAC learning.

Moreover, when the destination MAC address is not found in the MAC address table, the network switch forwards the received data frame to all its ports, except for the port at which the data frame was received. This creates additional traffic, due to data frames being forwarded to additional ports of the network switch, in the Ethernet network. The additional ports do not include the port at which the data frame was received. When the data frames are received at a router, and the router cannot find its own MAC address in the destination MAC address field of the data frames, the router is said to be flooded. Accordingly, the network switch is flooding data frames.

In an example, a host device, such as a Personal Computer or the like, sends data frames carrying payload data to the virtual router using the VRRP MAC address in the destination MAC address field. The virtual router is represented by a physical router that takes the role of virtual router master for a session identified by the VRRP MAC address. The session is typically a so called VRRP session which is known from VRRP terminology. When the physical router sends data frames carrying payload data back to the host, these data frames include a MAC address of the physical router in the source MAC address field. The physical router also sends special protocol frames, such as an announcement message according to VRRP i.e. an advertisement type message. These special protocol frames include the VRRP MAC address in the source MAC address field. Typically, the announcement message is sent periodically, e.g. through broadcast or multicast.

A failure, such as that a network switch goes down, may happen in the Ethernet network. A further switch, connected to the host device, will then no longer be able to forward data frames, intended for the master router, at the port connected to the network switch that went down. Thus, flooding will occur towards any other hosts or network switches, which are connected to the further switch mentioned above. See also FIG. 1*b* below.

A problem is that flooding occurs for a long time in the Ethernet network. The flooding will proceed until the announcement message is periodically sent. In order to shorten the time during which flooding occurs, the periodicity of the announcement message may be shortened. However, a shortened periodicity implies an increase of announcement messages, which take up valuable network resources which otherwise could be used for data frame carrying payload data.

SUMMARY

An object may be to alleviate, or at least reduce, the above mentioned problem.

According to a first aspect, the object is achieved by a method, performed by a routing device of a switched network, for managing data frames travelling in the Ethernet network. The routing device is addressable by a virtual Media Access Control address, "MAC address", for assignment to routers. The routing device sends a data frame comprising a source MAC address field, which includes a unicast MAC address of the routing device. The routing device sends a message including information about the virtual MAC address, wherein the routing device is configured to send, in a periodic manner, a periodic message for conveying information about the virtual MAC address throughout the switched network.

According to a second aspect, the object is achieved by a routing device of a switched network. The routing device is configured to manage data frames travelling in the Ethernet network. The routing device is addressable by a virtual Media Access Control address, "MAC address", for assignment to routers. The routing device is configured to send a data frame comprising a source MAC address field, which includes a unicast MAC address of the routing device. Hence, the routing device may send data frames carrying payload data in a conventional manner. Furthermore, the routing device is configured to send a message including information about the virtual MAC address. The routing device is configured to send, in a periodic manner, a periodic message for conveying information about the virtual MAC address throughout the switched network.

According to a third aspect, the object is achieved by a method, performed by a further routing device of a switched network, for managing data frames. The further routing device and a routing device are addressable by a virtual MAC address. The routing device and the further routing device form a virtual router. The further routing device receives at least one data frame. The further routing device sends, to the routing device, a request instructing the routing device to send an alert message for conveying information about the virtual MAC address throughout the switched network.

According to a fourth aspect, the object is achieved by a further routing device of a switched network. The further routing device is configured to manage data frames. The further routing device and a routing device are addressable by a virtual MAC address. The routing device and the further routing device form a virtual router. The further routing device is configured to receive at least one data frame. Furthermore, the further routing device is configured to send, to the routing device, a request instructing the routing device to send an alert message for conveying information about the virtual MAC address throughout the switched network.

According to further aspects, the object is achieved by a computer program and a carrier for the computer program corresponding to the aspects above.

In some first embodiments, the message is a further data frame comprising a source MAC address field, which includes the virtual MAC address. This means that different data frames, i.e. the data frame and the further data frame, have source MAC address fields which contents are different from each other. In more detail, the source MAC address field of the data frame includes the unicast MAC address of the routing device and the source MAC address field of the further data frame includes the virtual MAC address. In this manner, the virtual MAC address is used in the source MAC address field also for data frames, which e.g. includes payload data. This enables any existing network switches to learn the virtual MAC address from the further data frame, i.e. not only from special protocol frames as in prior art. Typically, data frames, such as the data frame and the further data frame, are sent more frequent than the special protocol frames. Accordingly, time during which flooding occurs is shortened.

In some second embodiments, the routing device receives, from a further routing device, a request which instructs the routing device to send the alert message. The further routing device sends, preferably shortly after a failure or flooding at the further routing device, the request. In response to the request, the routing device sends the message, which in these second embodiments comprises an alert message for conveying information about the virtual MAC address throughout the switched network. The alert message may be a special protocol frame, such as an announcement message, in case of VRRP, i.e. an advertisement type message. By means of the alert message, the information about the virtual MAC address is spread in the switched network. Hence, any existing network switch will learn the virtual MAC address and flooding may cease. Thus, thanks to that the routing device sends the alert message in response to the request, time during which flooding occurs may be shortened.

An advantage is hence that load, e.g. in terms of superfluous data frames caused by flooding, on the switched network is reduced.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1A:
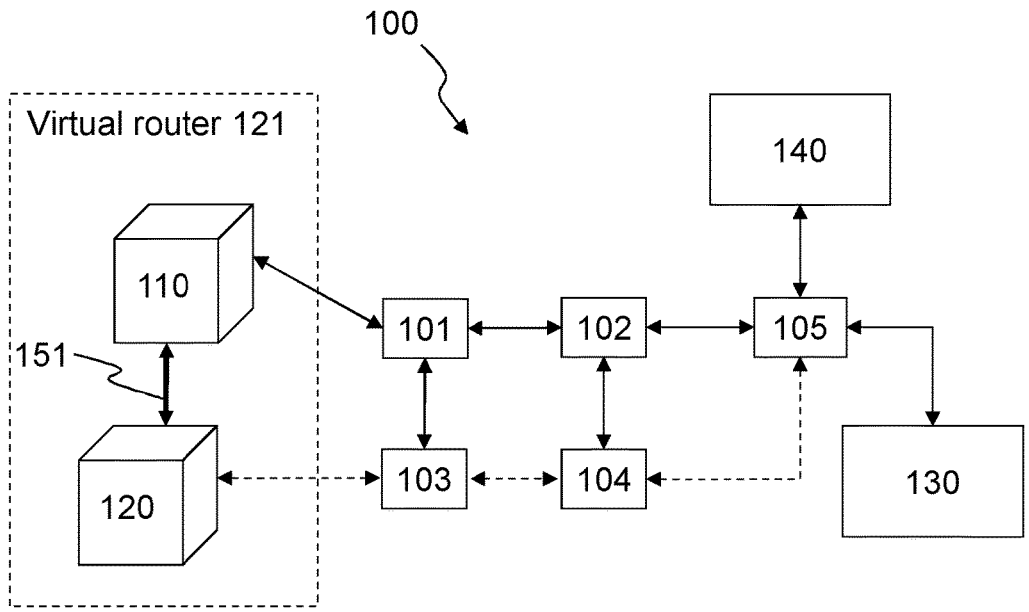
FIGS. 1a and 1b are schematic overviews of an exemplifying switched network in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1a depicts an exemplifying communication system in which embodiments herein may be implemented. In this example, the communication system is a switched network 100. In some examples, the switched network 100 may be an Ethernet network, a Layer 2 network or the like.

The switched network 100 comprises a routing device 110 and a further routing device 120.

The routing device 110 and the further routing device 120 may be physical routers for routing traffic, e.g. data frames, in a Media Access Control (MAC) layer, aka layer-2, of the switched network 100. Sometimes, this kind of physical router may be called a layer-3 switch (L3-switch). The routing devices 110, 120 terminate the layer-2 (L2) and routes information into layer-3 (L3).

The routing device 110 is addressable by a virtual Media Access Control address, "MAC address", for assignment to routers. This may mean that the routing device 110 may handle a session, e.g. a VRRP session, for which an interface (not shown) of the routing device 110 acts as a so called virtual router master according to VRRP technology or similar technologies. The routing device 110 may of course handle more than one session on the interface, but for sake of clarity only one session is considered. The session may be identified by the virtual MAC address, such as an VRRP MAC address.

In case the switched network 100 includes one or more virtual networks, such as Virtual Local Area Networks (VLANs), an identifier identifying a session, e.g. a VRRP session, in a first VLAN is required to be unique within that VLAN. However, the same identifier may be used for identifying another session, for example on the same routing device, in a second VLAN. The identifier may be a so called VRID for identifying a virtual router. The virtual MAC address may be generated from the VRID. In this manner, the session and/or the virtual router is communicatively identified by the VRRP MAC address in a unique manner per network, such as a physical or virtual network. As used herein, the term "session" is used to denote that a virtual router is configured in the network. This means that there is one session per virtual router.

The routing device 110 is configured to send, in a periodic manner, a periodic message for conveying information about the virtual MAC address throughout the switched network 100. The information about the virtual MAC address may thus be conveyed, e.g. announced in the switched network 100, by means of for example broadcast and/or multicast addressing, included in the periodic message. The routing device 110 may be configured to send the periodic message at points in time, which may occur at regular intervals. These periodic message are sent in order to enable the network switches to learn the virtual MAC address.

The virtual MAC address may be a Virtual Router Redundancy Protocol Media Access Control address, "VRRP MAC address", a VRRP Extended MAC address, "VRRPE MAC Address", a Hot Standby Router Protocol MAC Address "HSRP MAC address", or a MAC Address according to a protocol for providing virtual router functionality.

The periodic message may be an announcement message according to VRRP or VRRPE. The periodic message may have a different name in HSRP, but the same function and/or purpose.

Also, the further routing device 120 is addressable by the virtual MAC address. Consequently, the routing device 110 and the further routing device 120 form a virtual router 121, such as a VRRP router. The virtual router 121 is not a physical entity, but instead a virtual entity comprising the routing device 110 and the further routing device 120. The virtual router 121 may include one or more additional routing devices. It shall be noted that the virtual MAC address is a MAC address applicable for sending data frames to the virtual router 121, which effectively will be the routing device 110 or the further routing device 120 depending on which interface acts as virtual router master for a certain VRRP session, again using terminology of VRRP or similar protocols. It shall be understood that one and the same interface may take different roles, such as virtual master router or virtual router backup, for different sessions in the routing device 110 and/or the further routing device 120.

According to the second embodiments, the further routing device 120 manages no session on an interface towards the network switch 103. Thus, the interface acts as a virtual router backup with respect to the virtual router master associated to the interface on the routing device 110.

The switched network 100 further comprises a number of network switches 101-105.

The switched network 100 further comprises a first host 130 and a second host 140. The first host 130 is addressable by a MAC address of the first host 130.

Traffic, e.g. data frames, between the first host 130 and the virtual router, i.e. the routing device, passes through network switches denoted by 101, 102 and 105.

It may here be said that the traffic may be sent to/from other hosts (not shown) via the virtual router 121. However, it shall be understood that the session is defined for reception of traffic, e.g. data frames, from the first host 130. In this manner, it is transparent to the first host 130, whether it is an interface of the routing device 110 or the further routing device 120 that currently acts as virtual router master for the session.

As used herein the term "host" may refer to a Personal Computer (PC), a laptop, a cellular phone, a tablet PC, a smartphone, a user equipment, a server, a client, and the like.

In the Figure, each device, e.g. network switch, host, virtual router etc., is assumed to have one port at each side. The solid arrows indicate communication links to which ports are open and dashed arrows indicate communication links to which ports are closed.

Figure 1B:
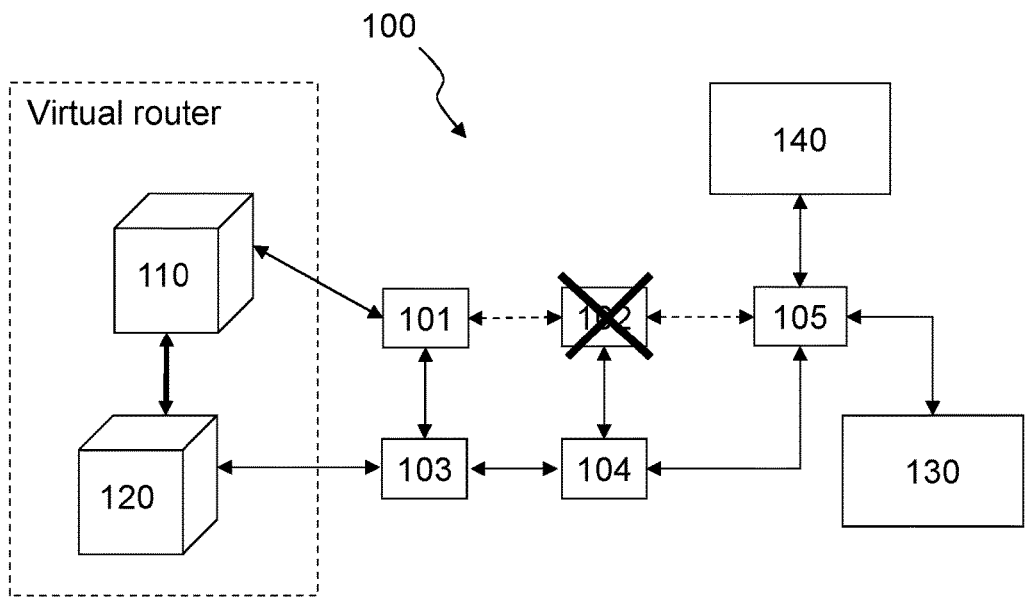

Now turning to FIG. 1b, there is illustrated a scenario in which the network switch 102 has a failure, e.g. power interruption, hardware malfunction, restart of network switch, failure of link to the network switch 102, manual blocking by configuration of ports or the like. Now that there is a failure, traffic needs to find a new way of passing between the first host 130 and the virtual router. The traffic may for example pass through the network switches denoted by 101, 103, 104 and 105.

When the failure has occurred, network switch 105 will flood, e.g. forward, any incoming data frames from the first host 130 to all its ports, except for the one towards the failed network switch 102. For example, the second host 140 will be flooded. Thanks to the first embodiments, flooding at the second host 140 will cease rapidly.

Similarly to the network switch 102, network switches 103, 104 will flood any incoming data frames. Thus, the further routing device 120 will unexpectedly receive data frames, e.g. addressed to the routing device 110. That is to say, the further routing device 120 is flooded. Thanks to the second embodiments, flooding at the further routing device 120 will cease rapidly.

Figure 2:
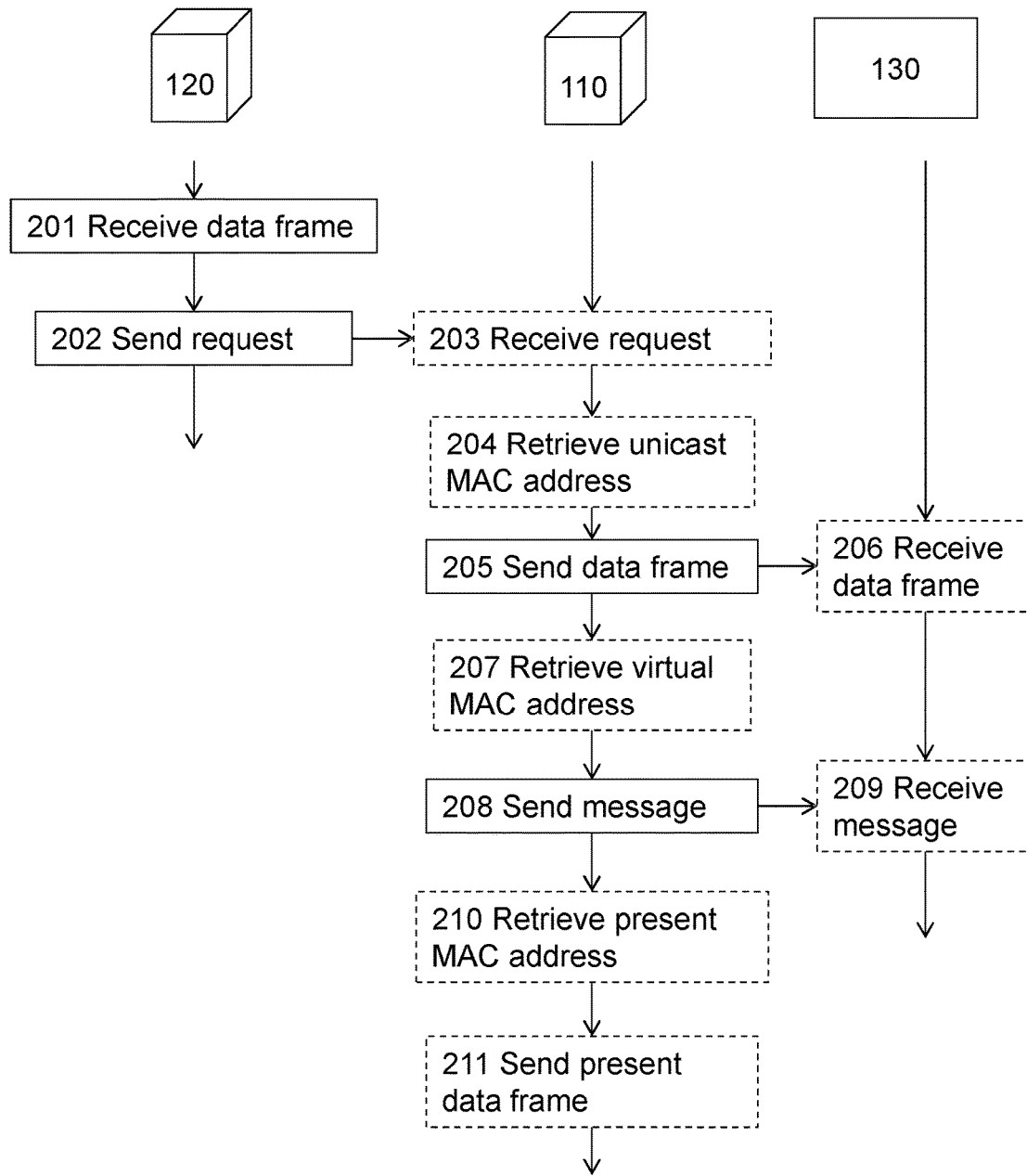
FIG. 2 is a schematic combined signaling and flowchart illustrating embodiments herein.

FIG. 2 illustrates an exemplifying method according to embodiments herein when performed in connection with the switched network 100 of FIG. 1. The routing device 110 of the switched network 100 performs a method for managing data frames, e.g. travelling in the switched network 100. As mentioned, the data frames may be MAC data frames, Ethernet frames or similar.

With the second embodiments, mentioned in the summary section, the further routing device 120 of the switched network 100 performs a method for managing data frames.

The following actions may be performed in any suitable order.

Action 201

In the second embodiments, the further routing device 120 may be addressable by the virtual MAC address, whereby the routing device 110 and the further routing device 120 form the virtual router 121. Hence, the further routing device 120 may be ready to act as a virtual router master, but presently acts as virtual router backup. This means that the further routing device 120 takes the roles as described above for a session identified by the virtual MAC address. Needless to say, the routing device 120 may at the same time take the role of virtual router master for another session. The roles may apply for a certain interface of the routing device 120.

In this action according to the second embodiments, the further routing device 120 receives at least one data frame. The at least one data frame may be received at one or more ports of the further routing device 120.

Expressed differently, the further routing device 120 may detect flooding of the at least one data frame, where the at least one data frame have a destination address field including the virtual MAC address.

Action 202

In response to action 201, the further routing device 120 sends 202, to the routing device 110, a request instructing the routing device 110 to send an alert message for conveying information about the virtual MAC address throughout the switched network 100. The alert message may be a special protocol frame, such as an announcement message, in case of VRRP, i.e. an advertisement type message, a gratuitous—Address Resolution Protocol (grat-ARP) message or the like. ARP is used to convert an Internet Protocol (IP) address to a physical address, such as an Ethernet address, also known as a MAC address.

The request may only be sent when the received at least one data frame may comprise a destination address field including the virtual MAC address, as mentioned above.

In some examples, in order to avoid that action 202 is performed excessively, i.e. much more than necessary, the request may only be sent less than a specific number of times counted from when action 201 was performed, i.e. flooding was detected at the further routing device.

Action 203

With the second embodiments, the routing device 110 may receive, from the further routing device 120, a request instructing the routing device 110 to send the alert message.

Action 204

According to the first embodiments, the routing device 110 may manage a list comprising the unicast MAC address, the virtual MAC address as well as further MAC addresses. In these embodiments, the message may be a further data frame.

In first embodiments, the routing device 110 may thus, before action 205, retrieve the unicast MAC address from the list.

In some examples, the routing device 110 may retrieve the unicast MAC address according to an algorithm for handling the list. This means for example that the routing device 110 applies a criterion, or the algorithm, in order to select which address of the list to retrieve.

The algorithm may be a Round Robin algorithm, a First-In-First-Out algorithm or the like.

Action 205

With the first and second embodiments, the routing device 110 sends, e.g. to the first host 130, the second host 140 or other hosts (not shown), a data frame comprising a source MAC address field, which includes a unicast MAC address of the routing device 110.

It shall be understood that the data frame may originate from said other hosts (as mentioned, these other hosts are not shown). The other hosts may thus send user data, carried by the data frame, to the first host 130 or the second host 140.

In one example, the routing device 110 may even generate the data frame comprising the source MAC address field that includes the unicast MAC address of the routing device 110. Such data frame may include a dummy payload, dummy user data, nonsense data or the like, i.e. any arbitrary data that the routing device 110 may generate.

Action 206

In case the data frame comprises a destination address field, which includes the MAC address of the first host 130, the first host 130 may receive the data frame from the routing device 110 after the data frame has passed though the switched network 100, i.e. the network switches.

Action 207

The routing device 110 may, before action 208, retrieve the virtual MAC address from the list. In some examples, the routing device 110 may retrieve the virtual MAC address according to the algorithm.

Action 208

The routing device 110 sends a message including information about the virtual MAC address. Thereby, enabling network switches 101-105 in the switched network 100 to update their respective lists of MAC addresses, in which MAC addresses are mapped to ports of the respective network switch. The message may be different from the periodic message.

In the first embodiments, the message may be a further data frame comprising a source MAC address field, which may include, e.g. may be populated by, the virtual MAC address. In this manner, the message enables the network switches 101, 102 and 105 to learn the virtual MAC address.

The further data frame may comprise a destination address field, which may include the MAC address of the first host 130, the second host 140 or other the like. Hence, as an example, the further data frame may be sent to the first or second host 130, 140.

When action 208 is performed after the network switch 102 has went down, e.g. due to power failure, maintenance or the like, the network switch 105 is able to learn the virtual MAC address by checking the source address field of the further data frame. Thus, when e.g. the first host 130 sends data that should pass via the virtual router, the network switch 105 will not flood, e.g. at the second host, since the network switch has already registered with which port of the network switch 105 the virtual MAC address is associated.

For example flooding at the further routing device 120 may not necessarily be interrupted, due to that the further data frame is sent as a unicast message to e.g. the first host 130. Therefore, depending on network topology of the switched network 100, the further data frame need not necessarily pass via the network switch 103, e.g. the network switch 101 may enable, or activate, a direct link (not shown) towards the network switch 101.

In a further embodiment, the message may comprise the virtual MAC address, wherein a further source MAC address field of the data frame may include the message. This embodiment requires the data frames to be extended in terms of fields specified for the data frame, e.g. by means of a change in a standard specification. In this manner, a data frame may be allowed to include multiple source MAC addresses in e.g. a plurality of source MAC address fields.

With the second embodiments, the message may comprise an alert message for conveying information about the virtual MAC address throughout the switched network 100. In this manner, the message enables the network switches to learn the virtual MAC address. In particular, the network switch 103, which at least partly caused flooding at the further routing device 120 when the network switch 102 is down, is able to learn from the alert message with which port of the network switch 103 the virtual MAC address is associated.

In these embodiments, the alert message may be sent less than a specific number of times, or until one of the points in time may have been reached. As mentioned above, the points in time relate to when the periodic message is sent by the routing device 110.

Moreover, the alert message may be sent until said one of the points in time may have been reached since the routing device 110 received the request in action 203.

Accordingly, action 208 may imply that the routing device 110 sends one or more alert messages, e.g. one or more of the alert message mentioned in the first sentence of this paragraph.

Action 209

When the destination address field of the further data frame includes the MAC address of the first host 130, the first host 130 may receive the message from the routing device 110.

Action 210

The routing device 110 may retrieve a present MAC address from the list.

In some examples, the routing device 110 may retrieve the present MAC address according to the algorithm.

Action 211

The routing device 110 may send a present data frame comprising a source MAC address field, which may include the present MAC address.

In some particular embodiments, action 201, e.g. the detection of the flooding, may be performed by another device (not shown), which may be referred to as a flooding detection device for detection of flooding of data frames in the switched network.

Furthermore, the flooding detection device may perform action 202. In this manner, the flooding detection, e.g. the function of flooding detection, is put in an entity, i.e. the flooding detection device, which is separate from the routing devices 110, 120.

Figure 3:
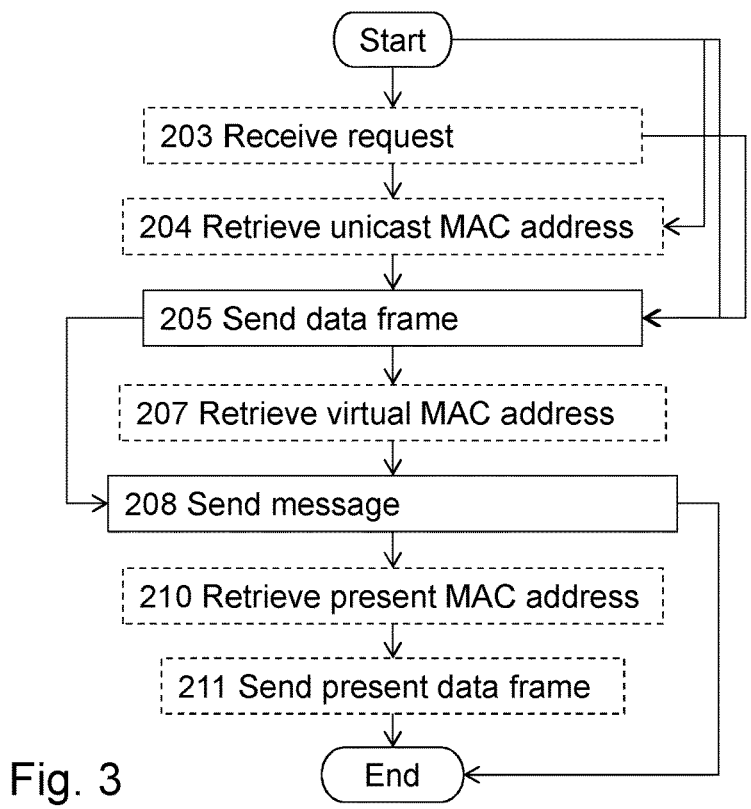
FIG. 3 is a flowchart illustrating embodiments of the method in the routing device.

In FIG. 3, a schematic flowchart of exemplifying methods in the routing device 110 is shown. Again, the same reference numerals as above have been used to denote the same or similar features, in particular the same reference numerals have been used to denote the same or similar actions. Accordingly, the routing device 110 of the switched network 100 performs a method for managing data frames travelling in the switched network 100.

As mentioned, the routing device 110 is addressable by a virtual Media Access Control address, "MAC address", for assignment to routers. The routing device 110 is configured to send, in a periodic manner, a periodic message for conveying information about the virtual MAC address throughout the switched network 100. The routing device 110 may be configured to send the periodic message at points in time, which may occur with regular intervals. The virtual MAC address may be a Virtual Router Redundancy Protocol Media Access Control address, "VRRP MAC address", a VRRP Extended MAC address, "VRRPE MAC Address", a Hot Standby Router Protocol MAC Address "HSRP MAC address", or a MAC Address according to a protocol for providing virtual router functionality. The periodic message may be an announcement message according to VRRP or VRRPE.

Again, with the second embodiments, the further routing device 120 may be addressable by the virtual MAC address, whereby the routing device 110 and the further routing device 120 forms a virtual router, wherein the further routing device 120 may be ready to act as a master router.

The following actions may be performed in any suitable order.

Action 203

According to the second embodiments, the routing device 110 may receive, from the further routing device 120, a request instructing the routing device 110 to send the alert message.

Action 204

According to the first embodiments, the routing device 110 may manage a list comprising the unicast MAC address and the virtual MAC address, wherein the message may be a further data frame In that case, the routing device 110 may, before the sending 205 of the data frame, retrieve the unicast MAC address from the list.

Action 205

Continuing with the first embodiments, the routing device 110 sends a data frame comprising a source MAC address field, which includes a unicast MAC address of the routing device 110.

The retrieving 205 of the unicast MAC address may be retrieved according to an algorithm for handling the list.

The algorithm may be a Round Robin algorithm, a First-In-First-Out algorithm.

Action 207

The routing device 110 may, before the sending 208 of the further data frame, retrieve 207 the virtual MAC address from the list. The retrieving 207 of the virtual MAC address may be retrieved according to the algorithm.

Action 208

The routing device 110 sends 208 a message including information about the virtual MAC address. The message may be different from the periodic message.

In the first embodiments, the message may be a further data frame comprising a source MAC address field, which may include the virtual MAC address.

The message may comprise the virtual MAC address, wherein a further source MAC address field of the data frame may include the message.

In the second embodiments, the message may comprise an alert message for conveying information about the virtual MAC address throughout the switched network 100.

The sending 208 of the alert message may be performed less than a specific number of times, or until one of the points in time may be reached.

The sending 208 of the alert message may be performed until said one of the points in time may be reached since the routing device 110 received the request.

Action 210

The routing device 110 may retrieve a present MAC address from the list. The retrieving 210 of the present MAC address may be retrieved according to the algorithm.

Action 211

The routing device 110 may send a present data frame comprising a source MAC address field, which may include the present MAC address.

Figure 4:
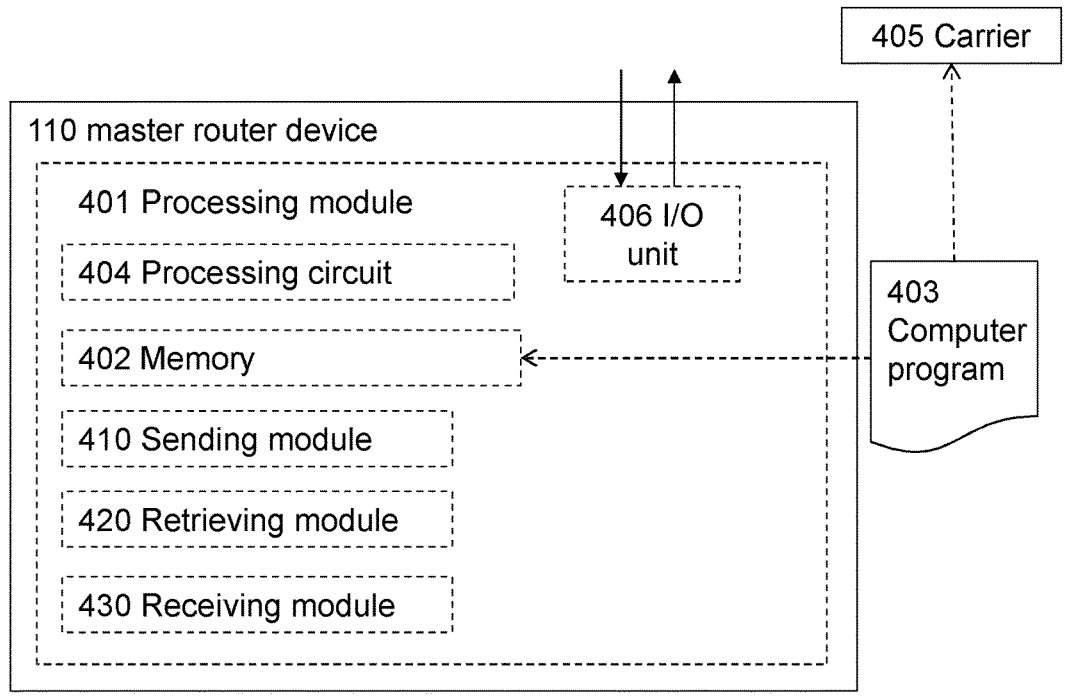
FIG. 4 is a block diagram illustrating embodiments of the routing device.

With reference to FIG. 4, a schematic block diagram of embodiments of the routing device 110 of FIG. 1 is shown. The routing device 110 of the switched network 100 is thus configured to manage data frames travelling in the switched network 100.

As mentioned, the routing device 110 is addressable by a virtual Media Access Control address, "MAC address", for assignment to routers.

The routing device 110 may comprise a processing module 401, such as a means, one or more hardware modules and/or one or more software modules for performing the methods described herein.

The routing device 110 may further comprise a memory 402. The memory may comprise, such as contain or store, a computer program 403.

According to some embodiments herein, the processing module 401 comprises, e.g. 'is embodied in the form of' or 'realized by', a processing circuit 404 as an exemplifying hardware module. In these embodiments, the memory 402 may comprise the computer program 403, comprising computer readable code units executable by the processing circuit 404, whereby the routing device 110 is operative to perform the methods of FIG. 2 and/or FIG. 3.

In some other embodiments, the computer readable code units may cause the routing device 110 to perform the method according to FIGS. 2 and/or 3 when the computer readable code units are executed by the routing device 110.

FIG. 4 further illustrates a carrier 405, comprising the computer program 403 as described directly above. The carrier 405 may be one of an electronic signal, an optical signal, a radio signal, and a computer readable medium.

In some embodiments, the processing module 401 comprises an Input/Output unit 406, which may be exemplified by a receiving module and/or a sending module as described below when applicable.

In further embodiments, the processing module 401 may comprise one or more of a sending module 410, a retrieving module 420, and a receiving module 430 as exemplifying hardware modules. In other examples, one or more of the aforementioned exemplifying hardware modules may be implemented as one or more software modules.

Therefore, according to the various embodiments described above, the routing device 110 is operative to and/or the routing device 110, the processing module 401 and/or the sending module 410 is configured to send a data frame comprising a source MAC address field, which includes a unicast MAC address of the routing device 110. Furthermore, the routing device 110 is configured to send a message including information about the virtual MAC address, wherein the routing device 110 is configured to send, in a periodic manner, a periodic message for conveying information about the virtual MAC address throughout the switched network 100.

The message may be different from the periodic message.

The routing device 110 may be configured to send the periodic message at points in time, which may occur with regular intervals.

The message may be a further data frame comprising a source MAC address field, which may include the virtual MAC address.

The message may comprise the virtual MAC address, wherein a further source MAC address field of the data frame may include the message.

In some embodiments, the routing device 110 may be configured to manage a list comprising the unicast MAC address and the virtual MAC address, wherein the message may be the further data frame.

The routing device 110 may be operative to and/or the routing device 110, the processing module 401 and/or the retrieving module 420 may be configured to, before sending of the data frame, retrieve the unicast MAC address from the list.

The routing device 110 may be operative to and/or the routing device 110, the processing module 401 and/or the retrieving module 420, or another retrieving module (not shown) may be configured to, before sending of the further data frame, retrieve the virtual MAC address from the list.

Furthermore, the routing device 110 may be operative to and/or the routing device 110, the processing module 401 and/or the retrieving module 420, or a further retrieving module (not shown), may be configured to retrieve a present MAC address from the list.

Moreover, the routing device 110 may be operative to and/or the routing device 110, the processing module 401 and/or the sending module 410, or another sending module (not shown), may be configured to send a present data frame comprising a source MAC address field, which may include the present MAC address.

The routing device 110 may be operative to and/or the routing device 110, the processing module 401 and/or the retrieving module 420 may be configured to retrieve the unicast MAC address according to an algorithm for handling the list. The routing device 110 may be operative to and/or the routing device 110, the processing module 401 and/or the retrieving module 420 may be configured to retrieve the virtual MAC address according to the algorithm. The routing device 110 may be operative to and/or the routing device 110, the processing module 401 and/or the retrieving module 420 may be configured to retrieve the present MAC address according to the algorithm.

The algorithm may be a Round Robin algorithm, or a First-In-First-Out algorithm.

The message may comprise an alert message for conveying information about the virtual MAC address throughout the switched network 100.

The routing device 110 may be operative to and/or the routing device 110, the processing module 401 and/or the sending module 410 may be configured to send the alert message less than a specific number of times, or until one of the points in time may be reached.

In some further embodiments, a further routing device 120 may be addressable by the virtual MAC address, whereby the routing device 110 and the further routing device 120 forms a virtual router, wherein the further routing device 120 may be ready to act as a master router.

The routing device 110 may be operative to and/or the routing device 110, the processing module 401 and/or the receiving module 430 may be configured to receive, from the further routing device 120, a request instructing the routing device 110 to send the alert message.

The routing device 110 may be operative to and/or the routing device 110, the processing module 401 and/or the sending module 410 may be configured to send the alert message until said one of the points in time may be reached since the routing device 110 received the request.

As mentioned, the virtual MAC address may be a Virtual Router Redundancy Protocol Media Access Control address, "VRRP MAC address", a VRRP Extended MAC address, "VRRPE MAC Address", a Hot Standby Router Protocol MAC Address "HSRP MAC address", or a MAC Address according to a protocol for providing virtual router functionality. The periodic message may be an announcement message according to VRRP or VRRPE.

Figure 5:
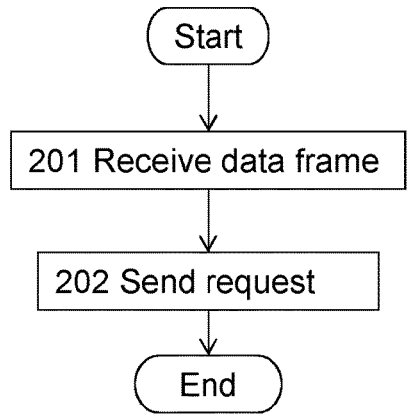
FIG. 5 is a flowchart illustrating embodiments of the method in the further routing device.

In FIG. 5, a schematic flowchart of exemplifying methods in the further routing device 120 is shown. Again, the same reference numerals as above have been used to denote the same or similar features, in particular the same reference numerals have been used to denote the same or similar actions. Accordingly, the further routing device 120 of the switched network 100 performs a method for managing data frames.

As mentioned, the further routing device 120 and a routing device 110 are addressable by a virtual MAC address, wherein the routing device 110 and the further routing device 120 form a virtual router.

The following actions, relating to the second embodiments, may be performed in any suitable order.

Action 201

The further routing device 120 receives 201 at least one data frame.

Action 202

The further routing device 120 sends 202, to the routing device 110, a request instructing the routing device 110 to send an alert message for conveying information about the virtual MAC address throughout the switched network 100.

The sending 202 of the request may be only performed when the receiving 201 of the at least one data frame may comprise detecting at least one data frame comprising a destination address field including the virtual MAC address.

The sending 202 of the request may be performed less than a specific number of times counted from the detection 201 of flooding.

The receiving 201 of the at least one data frame may comprise receiving the at least one data frame at one or more ports of the further routing device 120.

As mentioned, the virtual MAC address may be a Virtual Router Redundancy Protocol Media Access Control address, "VRRP MAC address", a VRRP Extended MAC address, "VRRPE MAC Address", a Hot Standby Router Protocol MAC Address "HSRP MAC address", or a MAC Address according to a protocol for providing virtual router functionality. The periodic message may be an announcement message according to VRRP or VRRPE.

Figure 6:
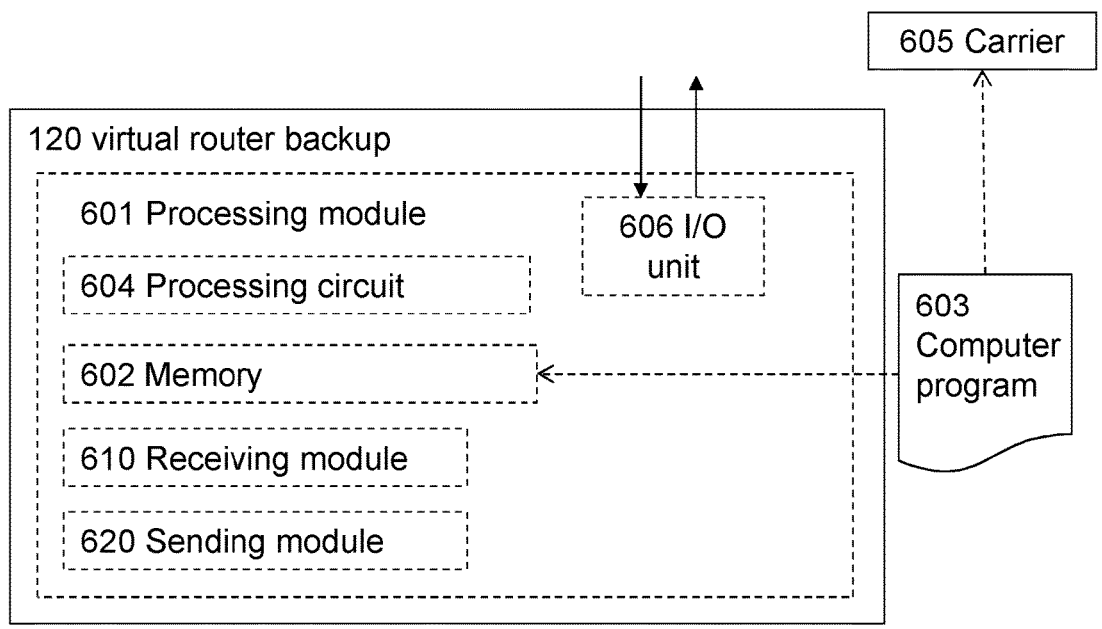
FIG. 6 is a block diagram illustrating embodiments of the further routing device.

With reference to FIG. 6, a schematic block diagram of embodiments of the further routing device 120 of FIG. 1 is shown. The further routing device 120 of the switched network 100 is thus configured to manage data frames As mentioned, the further routing device 120 and a routing device 110 are addressable by a virtual MAC address, wherein the routing device 110 and the further routing device 120 form a virtual router.

The further routing device 120 may comprise a processing module 601, such as a means, one or more hardware modules and/or one or more software modules for performing the methods described herein.

The further routing device 120 may further comprise a memory 602. The memory may comprise, such as contain or store, a computer program 603.

According to some embodiments herein, the processing module 601 comprises, e.g. 'is embodied in the form of' or 'realized by', a processing circuit 604 as an exemplifying hardware module. In these embodiments, the memory 602 may comprise the computer program 603, comprising computer readable code units executable by the processing circuit 604, whereby the further routing device 120 is operative to perform the methods of FIG. 2 and/or FIG. 5.

In some other embodiments, the computer readable code units may cause the further routing device 120 to perform the method according to FIGS. 2 and/or 5 when the computer readable code units are executed by the further routing device 120.

FIG. 6 further illustrates a carrier 605, comprising the computer program 603 as described directly above. The carrier 605 may be one of an electronic signal, an optical signal, a radio signal, and a computer readable medium.

In some embodiments, the processing module 601 comprises an Input/Output unit 606, which may be exemplified by a receiving module and/or a sending module as described below when applicable.

In further embodiments, the processing module 601 may comprise one or more of a receiving module 610, and a sending module 620 as exemplifying hardware modules. In other examples, one or more of the aforementioned exemplifying hardware modules may be implemented as one or more software modules.

Therefore, according to the various embodiments described above, the further routing device 120 is operative to and/or the further routing device 120, the processing module 601 and/or the receiving module 610 is configured to receive at least one data frame.

The further routing device 120 may be operative to and/or the further routing device 120, the processing module 601 and/or the receiving module 610 may be configured to receive the at least one data frame at one or more ports of the further routing device 120.

Furthermore, the further routing device 120 is operative to and/or the further routing device 120, the processing module 601 and/or the sending module 620 is configured to send, to the routing device 110, a request instructing the routing device 110 to send an alert message for conveying information about the virtual MAC address throughout the switched network 100.

The further routing device 120 may be operative to and/or the further routing device 120, the processing module 601 and/or the sending module 620 may be configured to send the request only when the received at least one data frame may comprise a destination address field including the virtual MAC address.

The further routing device 120 may be operative to and/or the further routing device 120, the processing module 601 and/or the sending module 620 may be configured to send the request less than a specific number of times counted from when the at least one data frame was received.

As mentioned, the virtual MAC address may be a Virtual Router Redundancy Protocol Media Access Control address, "VRRP MAC address", a VRRP Extended MAC address, "VRRPE MAC Address", a Hot Standby Router Protocol MAC Address "HSRP MAC address", or a MAC Address according to a protocol for providing virtual router functionality. The periodic message may be an announcement message according to VRRP or VRRPE.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the expressions "acting as virtual router master" and/or "acting as virtual router backup" may be used interchangeably with the expressions "take the role of virtual router master" and/or "take the role of virtual router backup" while implying a similar or the same meaning.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a first routing device of a plurality of routing devices comprised in a virtual router of a switched network, the method comprising:
receiving, from a further routing device comprised in the virtual router, a request triggered by the further routing device receiving a data frame addressed to a virtual Media Access Control (MAC) address;
responsive to receiving the request, alerting routers in the switched network of a unicast MAC address of the routing device by sending the unicast MAC address in a source MAC address field of a different data frame over the switched network; and
responsive to a router alerted to the unicast MAC address going offline, updating other routers in the switched network by sending a message comprising information about the virtual MAC address over the switched network;
wherein the virtual MAC address is a Virtual Router Redundancy Protocol (VRRP) Media Access Control address, a VRRP Extended MAC address, or a Hot Standby Router Protocol MAC Address.

2. The method of claim 1, further comprising updating the routers in the switched network at regular intervals by sending information about the virtual MAC address in periodic messages that are different from the message.

3. The method of claim 1, wherein the message is a further data frame comprising a source MAC address field, which includes the virtual MAC address.

4. The method of claim 2, wherein the periodic messages are announcement messages according to Virtual Router Redundancy Protocol (VRRP) or VRRP Extended.

5. A first routing device of a plurality of routing devices comprised in a virtual router of a switched network, the routing device comprising:
processing circuitry;
memory containing instructions executable by the processing circuitry whereby the first routing device is configured to:
receive, from a further routing device comprised in the virtual router, a request triggered by the further routing device receiving a data frame addressed to a virtual Media Access Control (MAC) address;
responsive to receiving the request, alert routers in the switched network of a unicast MAC address of the routing device by sending the unicast MAC address in a source MAC address field of a different data frame over the switched network; and
responsive to a router alerted to the unicast MAC address going offline, update other routers in the switched network by sending a message comprising information about the virtual MAC address over the switched network;
wherein the virtual MAC address is a Virtual Router Redundancy Protocol (VRRP) Media Access Control address, a VRRP Extended MAC address, or a Hot Standby Router Protocol MAC Address.

6. The first routing device of claim 5, wherein the instructions further configure the first routing device to update the routers in the switched network at regular intervals by sending information about the virtual MAC address in periodic messages that are different from the message.

7. The first routing device of claim 5, wherein the message is a further data frame comprising a source MAC address field, which includes the virtual MAC address.

8. The first routing device of claim 6, wherein the periodic messages are announcement messages according to Virtual Router Redundancy Protocol (VRRP) or VRRP Extended.

9. A non-transitory computer readable recording medium storing a computer program product for controlling a first routing device of a plurality of routing devices comprised in a virtual router of a switched network, the computer program product comprising software instructions which, when run on processing circuitry of the first routing device, cause the first routing device to:
receive, from a further routing device comprised in the virtual router, a request triggered by the further routing device receiving a data frame addressed to a virtual Media Access Control (MAC) address;
responsive to receiving the request, alert routers in the switched network of a unicast MAC address of the routing device by sending the unicast MAC address in a source MAC address field of a different data frame over the switched network; and
responsive to a router alerted to the unicast MAC address going offline, update other routers in the switched network by sending a message comprising information about the virtual MAC address over the switched network;
wherein the virtual MAC address is a Virtual Router Redundancy Protocol (VRRP) Media Access Control address, a VRRP Extended MAC address, or a Hot Standby Router Protocol MAC Address.

10. The non-transitory computer readable recording medium of claim 9, wherein the software instructions further cause the first routing device to update the routers in the switched network at regular intervals by sending information about the virtual MAC address in periodic messages that are different from the message.

11. The non-transitory computer readable recording medium of claim 10, wherein the periodic messages are announcement messages according to Virtual Router Redundancy Protocol (VRRP) or VRRP Extended.

12. The non-transitory computer readable recording medium of claim 9, wherein the message is a further data frame comprising a source MAC address field, which includes the virtual MAC address.

* * * * *